Figure 1:
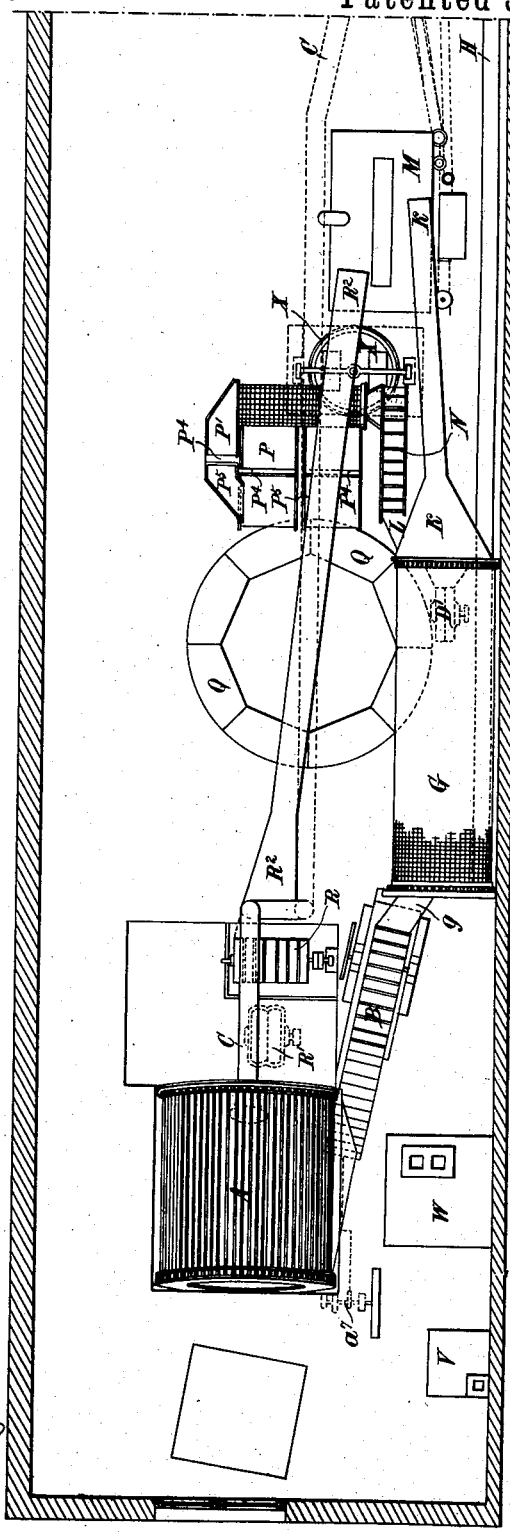

(No Model.) 13 Sheets—Sheet 2.

J. C. W. STANLEY & J. RUSSELL.
APPARATUS FOR THE TREATMENT OF CITY REFUSE.

No. 455,802. Patented July 14, 1891.

Witnesses:
W. S. McArthur
G. P. Kramer.

Inventors:
John C. W. Stanley
Joseph Russell.
By Foster & Freeman
Attorneys.

(No Model.) 13 Sheets—Sheet 5.

J. C. W. STANLEY & J. RUSSELL.
APPARATUS FOR THE TREATMENT OF CITY REFUSE.

No. 455,802. Patented July 14, 1891.

Witnesses:
H. S. McArthur
G. P. Kramer

Inventors:
John C. W. Stanley
Joseph Russell,
By Foster Freeman
Attorneys.

(No Model.)  
13 Sheets—Sheet 6.

J. C. W. STANLEY & J. RUSSELL.
APPARATUS FOR THE TREATMENT OF CITY REFUSE.

No. 455,802. Patented July 14, 1891.

Witnesses:
H. S. McArthur
G. P. Kramer

Inventors:
John C. W. Stanley
Joseph Russell

By Foster Freeman
Attorneys.

(No Model.) 13 Sheets—Sheet 7.
J. C. W. STANLEY & J. RUSSELL.
APPARATUS FOR THE TREATMENT OF CITY REFUSE.
No. 455,802. Patented July 14, 1891.
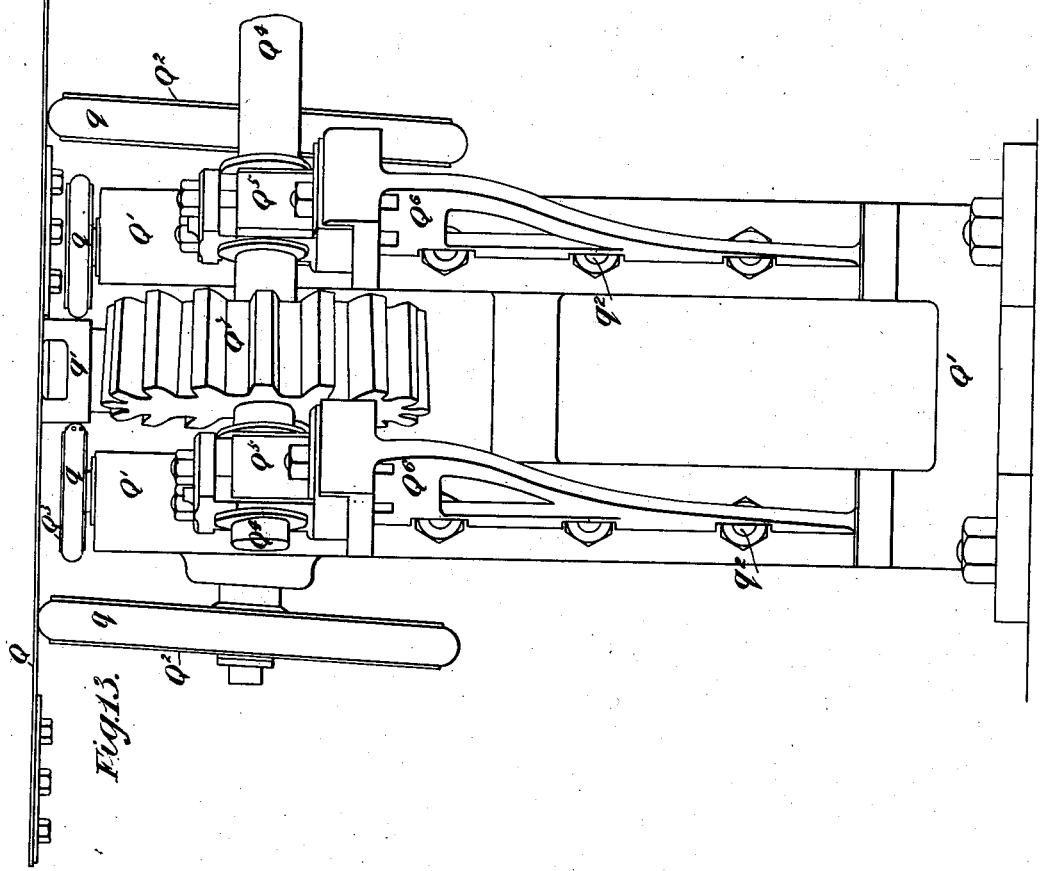
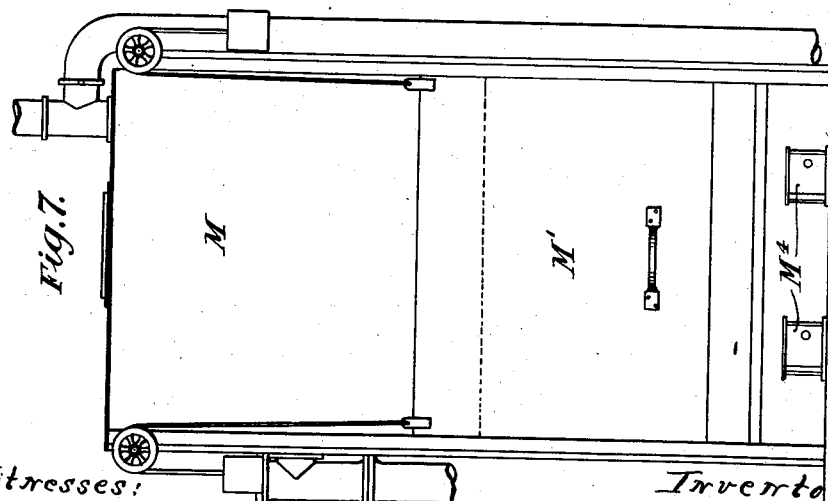

(No Model.)

13 Sheets—Sheet 8.

J. C. W. STANLEY & J. RUSSELL.
APPARATUS FOR THE TREATMENT OF CITY REFUSE.

No. 455,802. Patented July 14, 1891.

Witnesses:
H. S. McArthur
G. P. Kramer.

Inventors:
John C. W. Stanley
Joseph Russell,
By Sadler Freeman
Attorneys.

(No Model.) 13 Sheets—Sheet 9.
J. C. W. STANLEY & J. RUSSELL.
APPARATUS FOR THE TREATMENT OF CITY REFUSE.
No. 455,802. Patented July 14, 1891.
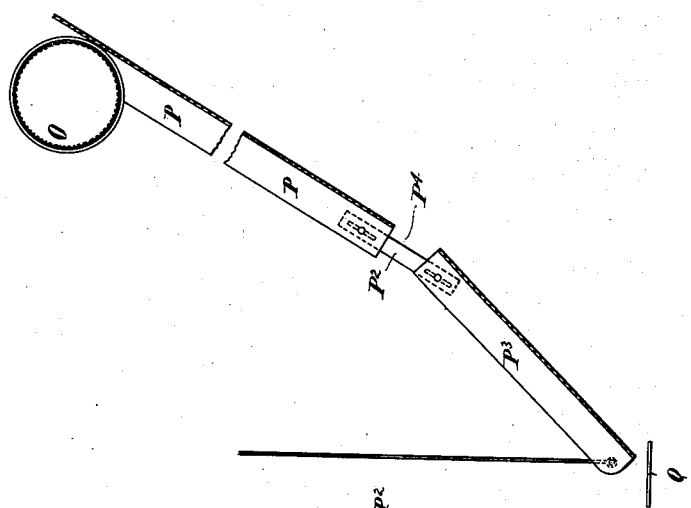
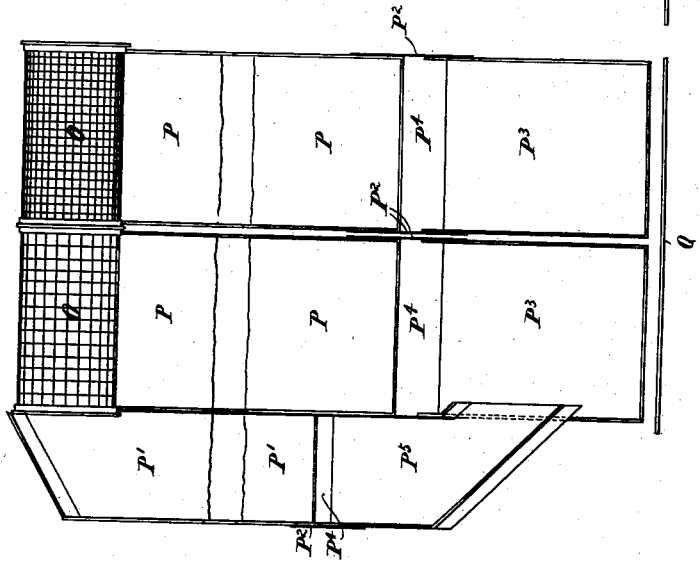

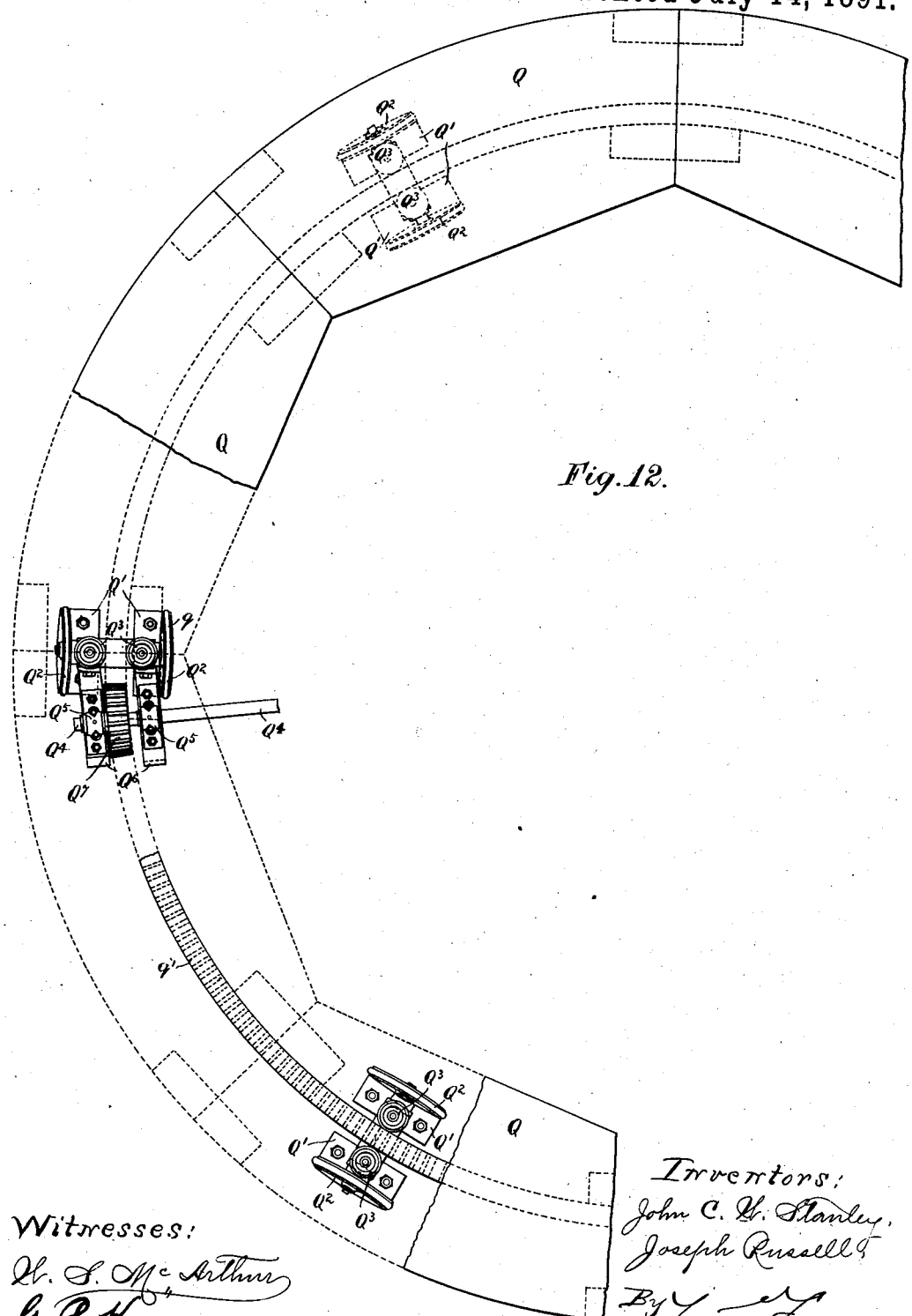

(No Model.)  
13 Sheets—Sheet 11.
J. C. W. STANLEY & J. RUSSELL.
APPARATUS FOR THE TREATMENT OF CITY REFUSE.
No. 455,802.  
Patented July 14, 1891.
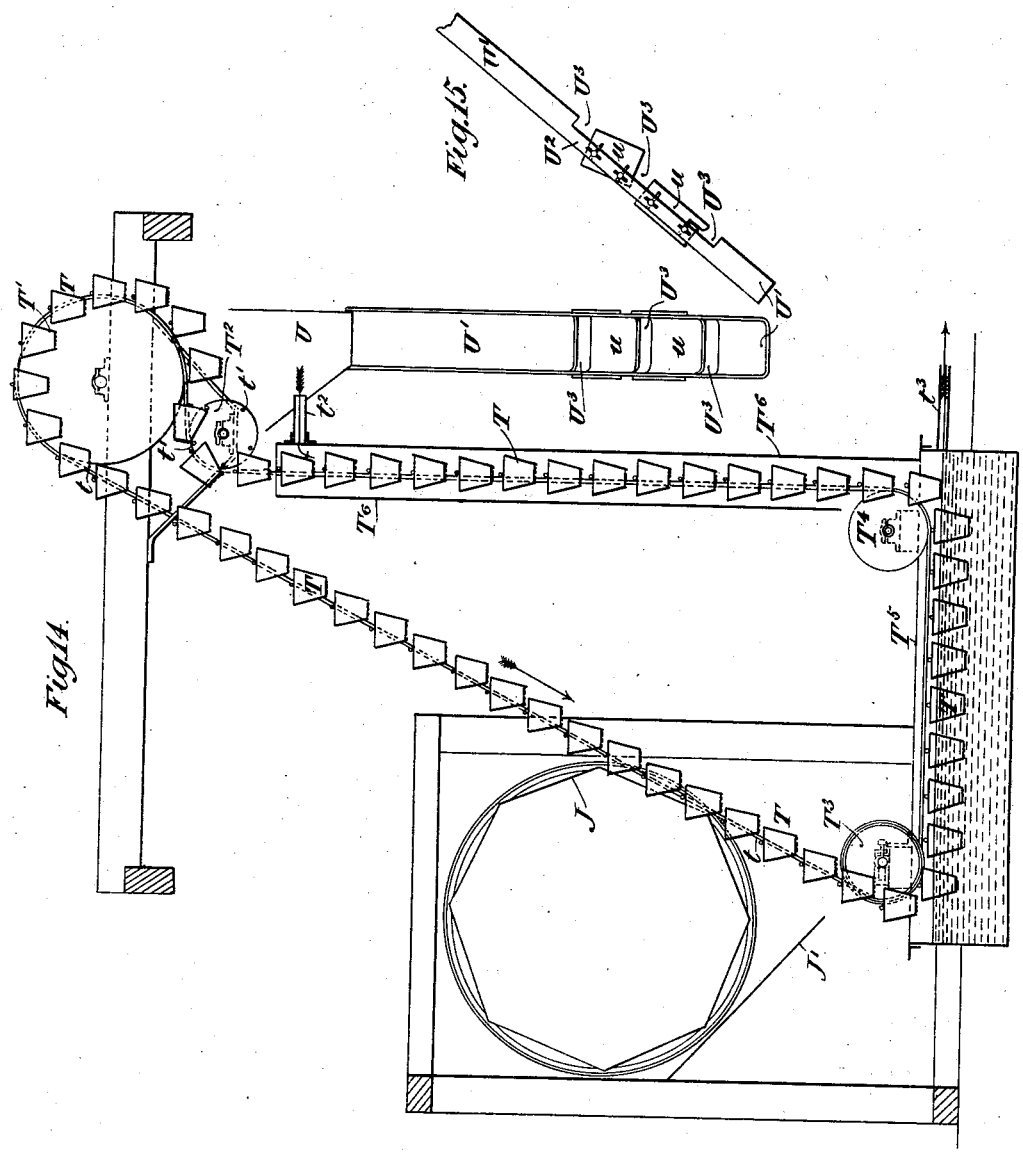
Witnesses:  
H. S. McArthur  
G. P. Kramer
Inventors:  
John C. W. Stanley  
Joseph Russell  
By Foster Freeman  
Attorneys.

(No Model.) 13 Sheets—Sheet 12.
J. C. W. STANLEY & J. RUSSELL.
APPARATUS FOR THE TREATMENT OF CITY REFUSE.
No. 455,802. Patented July 14, 1891.
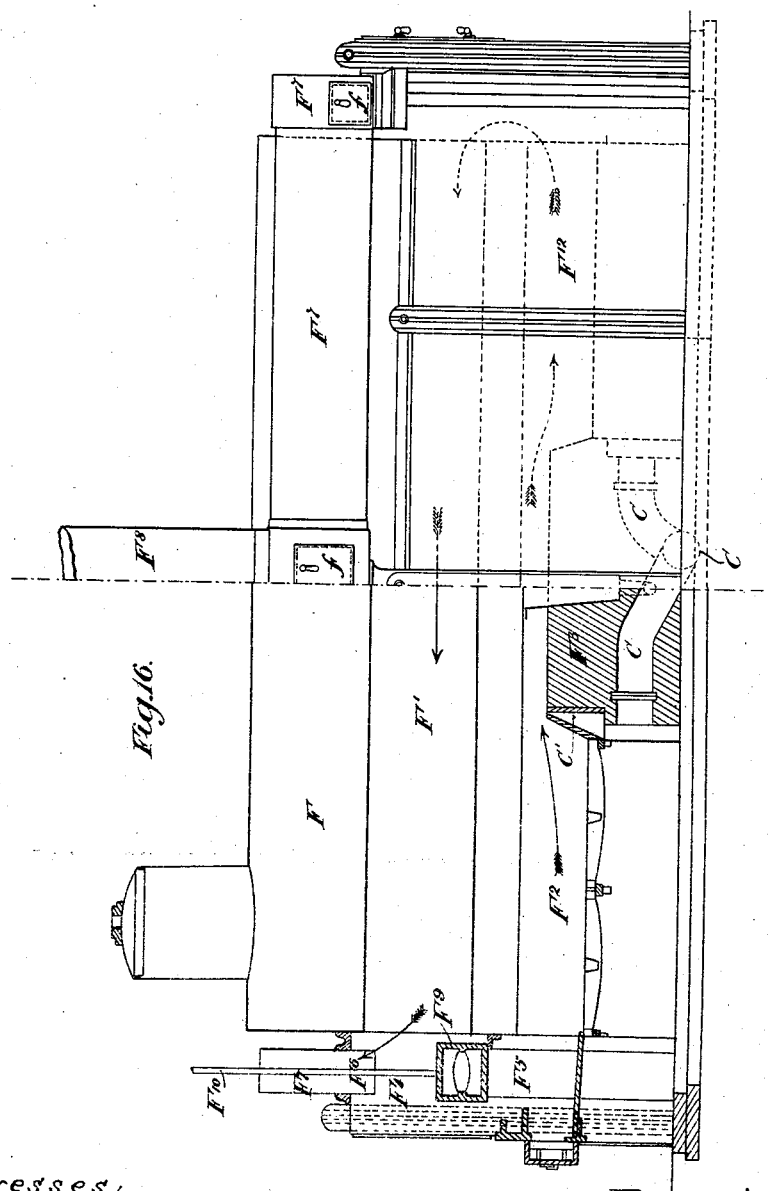
Witnesses:
H. S. McArthur
G. P. Kramer
Inventors:
John C. W. Stanley.
Joseph Russell.
By Foster Freeman
Attorneys.

(No Model.) 13 Sheets—Sheet 13.
J. C. W. STANLEY & J. RUSSELL.
APPARATUS FOR THE TREATMENT OF CITY REFUSE.
No. 455,802. Patented July 14, 1891.
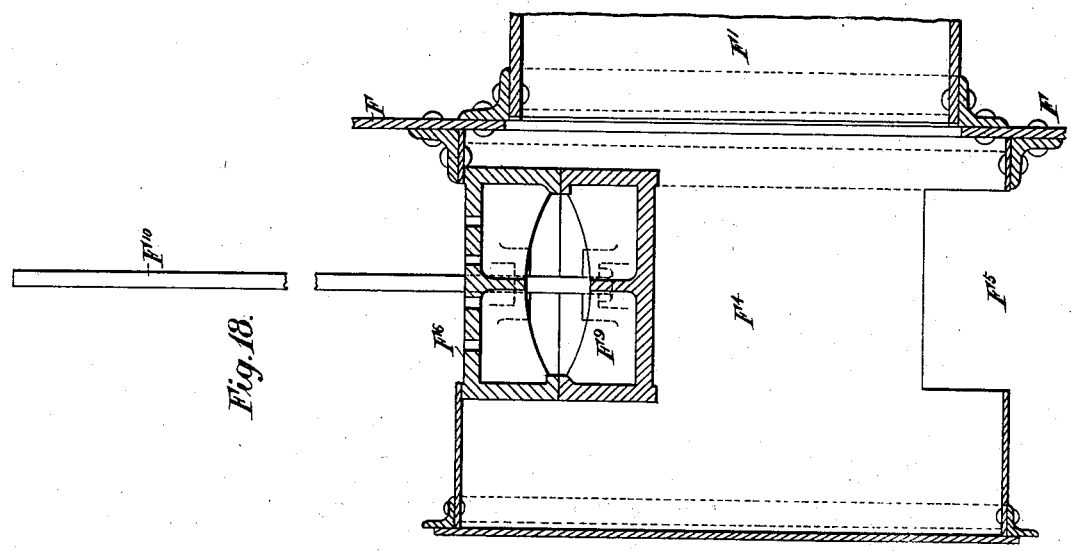
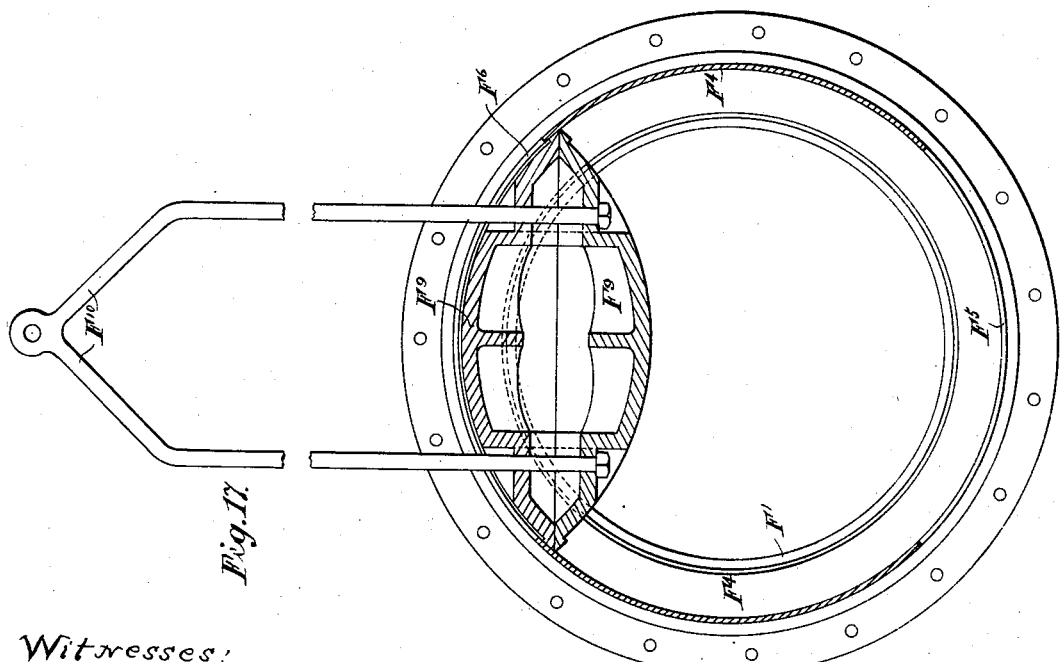
Witnesses:
H. S. McArthur
G. P. Kramer.
Inventors:
John C. W. Stanley,
Joseph Russell,
By Foster Freeman
Attorneys.

United States Patent Office.

JOHN CHARLES WILLIAM STANLEY AND JOSEPH RUSSELL, OF LONDON, ENGLAND.

APPARATUS FOR THE TREATMENT OF CITY REFUSE.

SPECIFICATION forming part of Letters Patent No. 455,802, dated July 14, 1891.

Application filed April 23, 1890. Serial No. 349,112. (No model.) Patented in England January 28, 1889, No. 1,540; in France November 14, 1889, No. 201,922, and in Germany November 20, 1889, No. 17,301.

*To all whom it may concern:*

Be it known that we, JOHN CHARLES WILLIAM STANLEY and JOSEPH RUSSELL, both subjects of the Queen of England, residing at London, in England, have invented certain new and useful Improvements in Apparatus for the Treatment of City Refuse, (for which we have obtained patent in Great Britain, No. 1,540, dated January 28, 1889; in France, No. 201,922, filed November 14, 1889, and in Germany, No. 17,301, filed November 20, 1889,) of which the following is a specification.

The object of this invention is to so treat the refuse collected from dust-bins, ash-pits, dust-boxes, and the like (and which consists of a great variety of different materials and articles, especially small coal, cinders, coke, ashes, pieces and scraps of paper, straw, glass bottles, nails, scraps of iron and tin, old kettles and pans, pieces of string, and many other things) as to separate them into their respective species, collecting the coal, cinders, &c., for fuel, the paper, strings, and other suitable materials for paper-pulp, the metals for scrap, (recovering the solder or tin from the tinned articles or tin-plate, if desired,) carbonizing the vegetable refuse into charcoal and collecting the absolute refuse, of which very little remains at the end of the process, for disposal in the most convenient manner. To effect such a result as this with such materials involves an elaborate and continuous process and various special machines and apparatus to which the materials are successively delivered, a system of subdivision constantly going on as the operation progresses and the various sorted species radiating, as it were, from the common center, at which the refuse is tipped out of the cart and the treatment begins.

To secure the desired result many different arrangements, both as regards the order in which the refuse is treated and the machines for treating it, may be resorted to without departing from the spirit of the invention, and in order that the said invention may be clearly understood we have, as an example, illustrated in the accompanying drawings a series of machines for carrying our invention into practice.

In the drawings, Figures 1 and 1$^a$ are two parts of the same plan, Fig. 1$^a$ being a longitudinal continuation of Fig. 1, of a complete plant constructed according to our invention. Figs. 2 to 18, inclusive, are views of the various machines or apparatus employed in such plant, and all of which are hereinafter more particularly described.

Like letters indicate like parts throughout the drawings.

Figure 2:
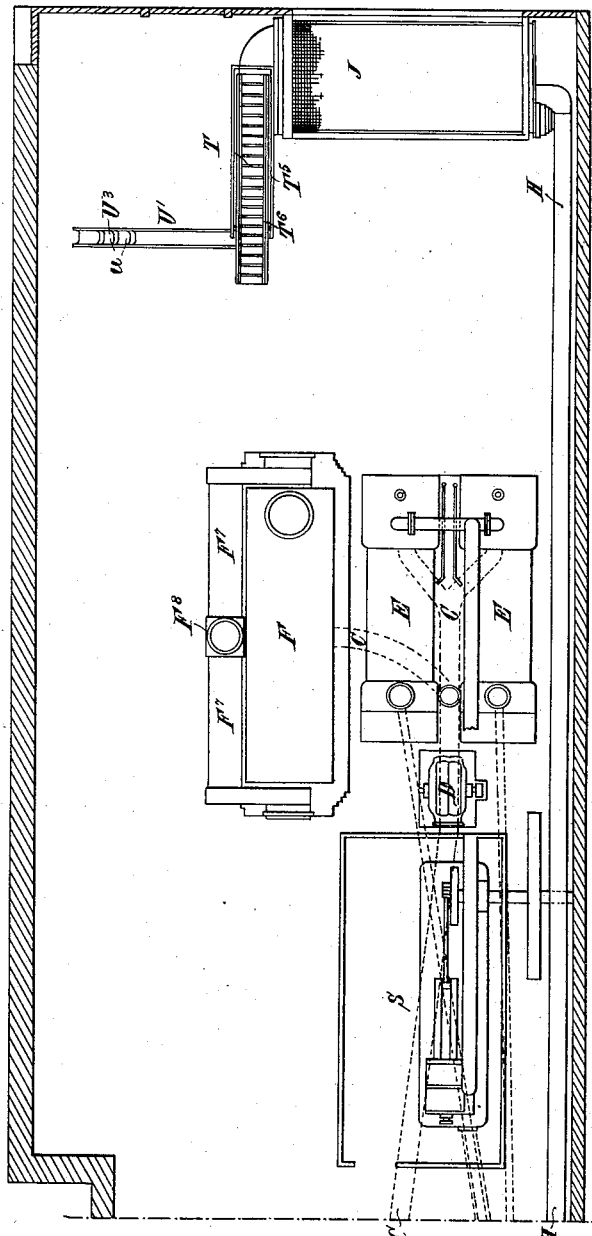
Figure 3:
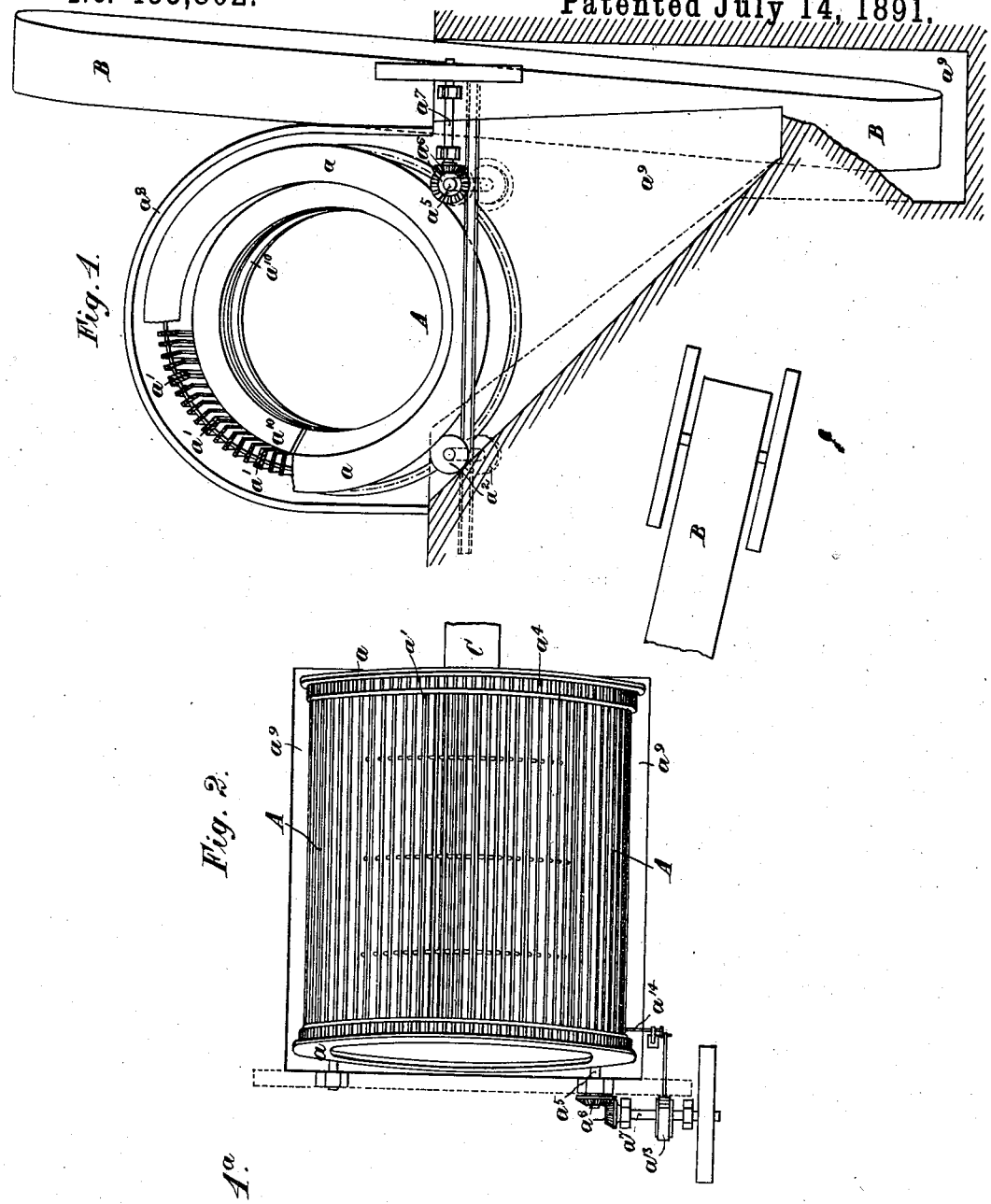
Figure 4:
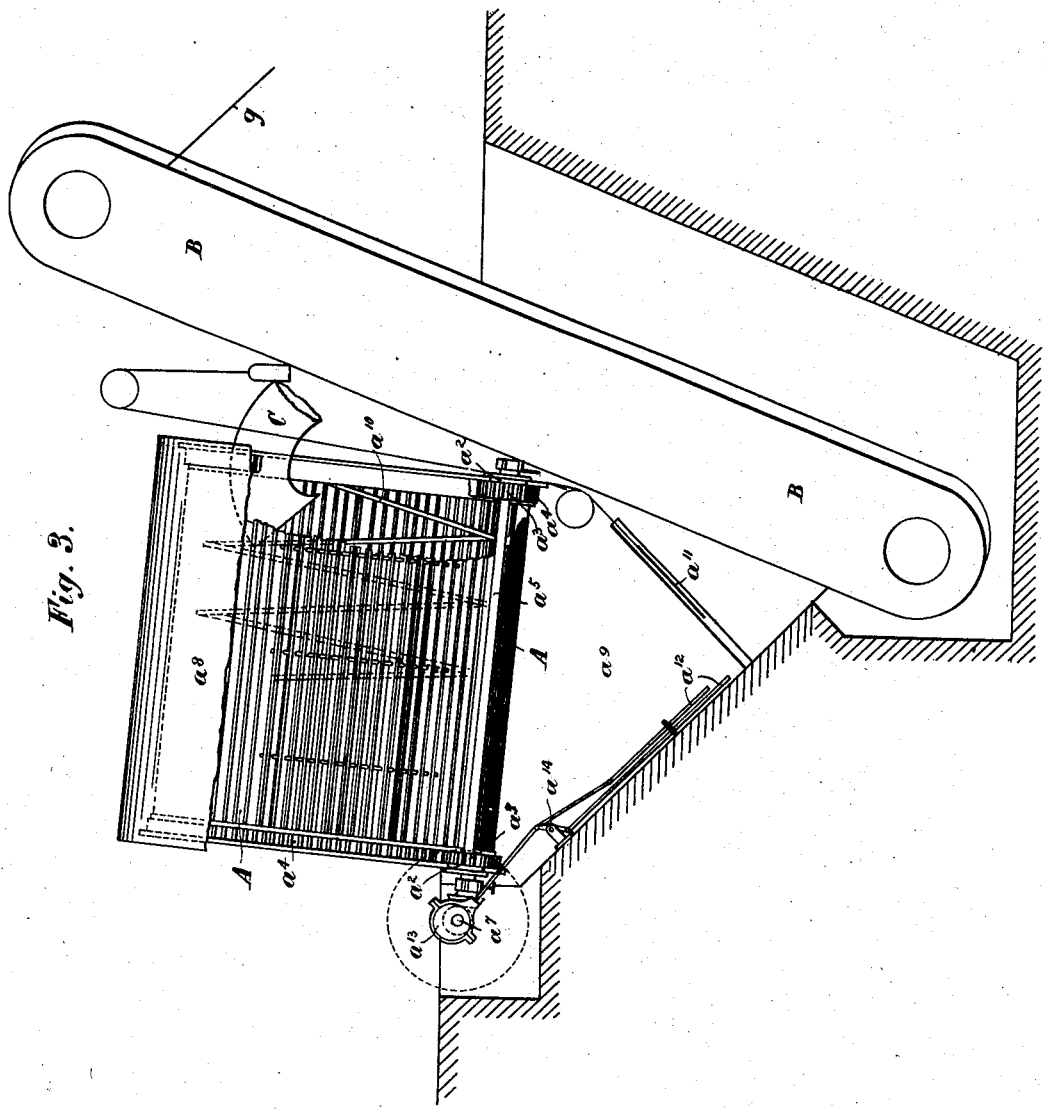

Fig. 2 is a plan, and Figs. 3 and 4 respectively a side and front elevation, of the revolving reception drum or screen, into which the refuse is tipped directly from the cart or other vehicle by which it has been conveyed to the works. This reception-screen consists, essentially, of a cylindrical cage A, constructed preferably of longitudinally-disposed wooden laths advantageously about three inches apart and suitably braced together, so as to form with the two end rings $a$ and the T-iron bars $a'$ (shown in thick lines in Fig. 4 and in detail in Fig. 4$^a$) connecting such rings, a structure of rigidity sufficient to withstand the effects of vibration and the shock due to the tipping in of the refuse, while by the employment of wooden laths instead of metal bars, bottles, glass, and crockery are saved from breaking. The size of the drum A or front opening thereof and the position of the said drum relatively to the floor-level are such that the wagons conveying the refuse to the works may tip their contents directly into it.

As shown more clearly in Fig. 3, the cage A is preferably supported in an inclined position on rollers $a^2$, in the peripheral grooves of which the rims or flanges of the rings $a$ engage. Besides the rollers $a^2$, thrust-rollers (not shown in the drawings) may, if necessary, be provided to bear against the rear end of the drum to take the thrust when the refuse is introduced into it. The two rollers $a^2$, carried by the shafts $a^5$, are formed in part with the toothed pinions $a^3$, which engage toothed racks $a^4$, formed externally on the rings $a$. (See Figs. 3, 4, and 6.) The pinions $a^3$ are secured to the shaft $a^5$, which, through bevel-gearing $a^6$, has rotary motion transmitted to it from the shaft $a^7$, which may be driven in any convenient manner. The upper part of the drum A is surrounded by a suitable casing $a^8$, which, however, does not close in the ends of the drum, these being left exposed, the front one for the introduction of the refuse and rear one for the withdrawal of those portions of the refuse which are too large to pass between the laths of the drum and which may be picked out by hand. The drum itself is situated immediately over a pit $a^9$, which is shaped like a hopper, so that it will conduct all the matter falling from the drum into it toward the lower end of an elevator B, by which it is conveyed to the next machine.

The drum throughout a part of or throughout its entire length may be provided with an internal helix or screw creeper or conveyer $a^{10}$, to assist in moving the refuse from the front to the rear end. This is especially requisite when the drum is horizontal or supported at but a slight incline; but if the drum be supported at a more or less steep incline, the refuse itself will gravitate toward the rear end and will render such a screw-creeper unnecessary.

$a^{11}$, Fig. 3, is a door provided in the outlet-opening of the pit $a^9$ for checking the passage of the refuse to the elevator B, so as to prevent the said elevator from becoming choked. This door may be adjusted after the manner of a damper, so that the refuse may be allowed to pass more or less quickly.

$a^{12}$, Fig. 3, are two rods, which are reciprocated alternately in and among the refuse at the upper side of the door $a^{11}$, so as to agitate the refuse and keep it steadily moving downward to the elevator B. A convenient way of operating these rods, as shown in Figs. 2 and 3, is by means of an eccentric $a^{13}$, secured on the before-mentioned shaft $a^7$, and the rod of which oscillates a rocking shaft $a^{14}$, which carries a lever, to the opposite ends of which the rods $a^{12}$ are respectively connected; but means other than these may be provided for operating the rods $a^{12}$.

Into the upper part of the drum A and projecting from the rear toward the front is the inlet end of the exhaust-pipe C, which end is preferably widened out after the manner of a trumpet-mouth. The pipe C, which at its inlet end serves to draw off from the drum A the dust raised during the rotation thereof, is, as shown in Fig. 1$^a$, connected to a powerful fan D, which serves the double purpose of withdrawing the dust from the drum A and supplying the forced draft to the furnaces of the boilers E E and F, whereby the dust from the drum A is burned.

Although the reception-drum A has been described as rotating on a horizontal or nearly-horizontal axis, yet there may be used a drum which rotates on a vertical or nearly-vertical axis.

Figure 5:
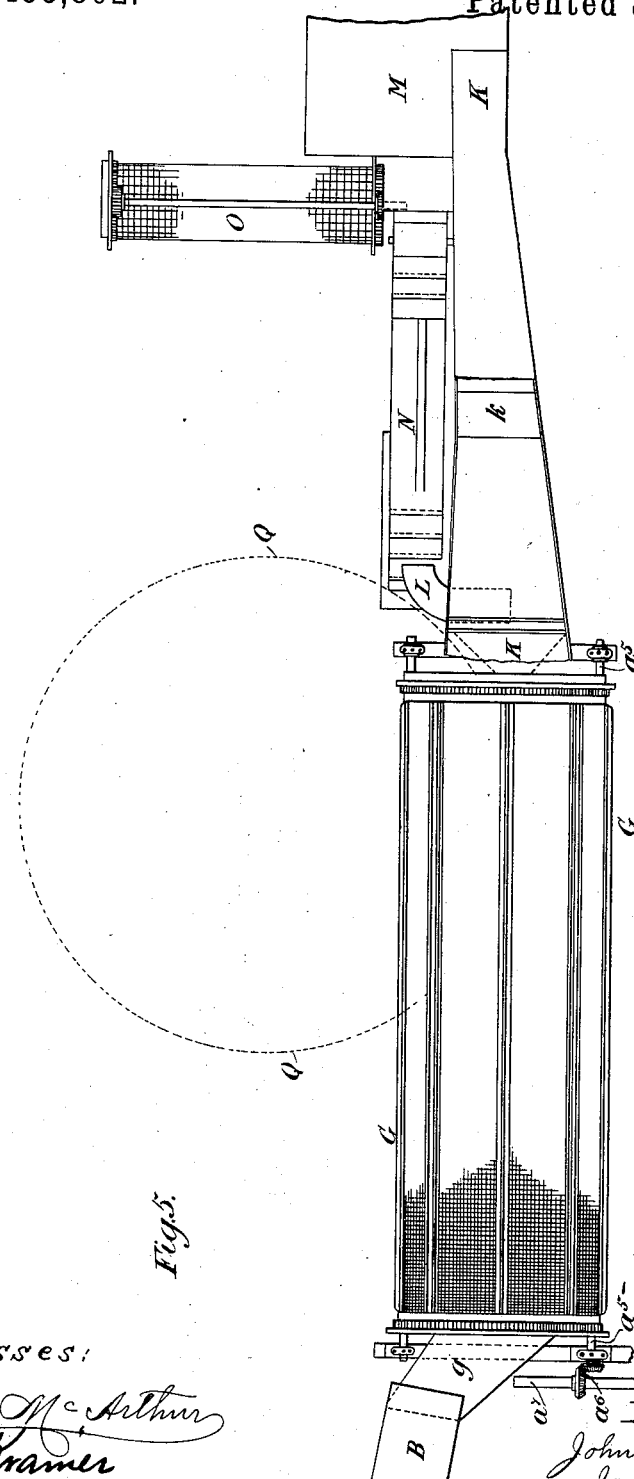
Figure 6:
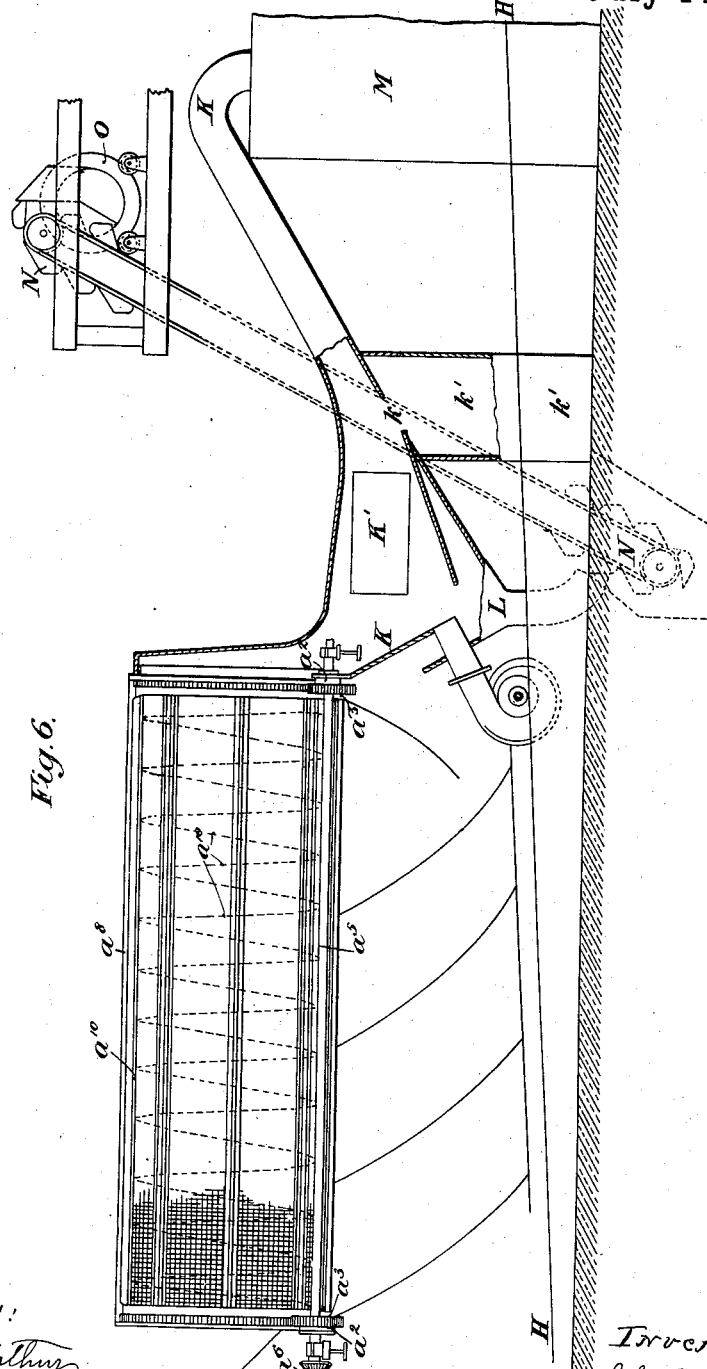

The elevator B, which may be of any ordinary and suitable construction and operated in any convenient manner, conveys the refuse from the lower part or outlet-opening of the pit $a^9$ up to a short chute or hopper $g$, by which it is introduced into the screen G, which is shown most clearly in plan in Fig. 5 and in elevation in Fig. 6, and the reference-letters for which are the same as those employed for the drum A. This screen, which may be cylindrical, but is preferably of octagonal or other polygonal section, is supported on rollers $a^2$ and driven by pinions $a^3$ in a manner similar to that hereinbefore described when referring to the drum A. A convenient size for the mesh of this screen is an inch and a half, but it may be of any other required size. Inside the screen is provided a helix or screw-conveyer $a^{10}$ for moving the refuse from the end where it is received to the other or outlet end. The said screen is incased in a suitable casing $a^8$, the lower part of which forms an inclined chute $a^{20}$ for conducting the matter which falls through the meshes of the screen onto an endless continuously-traveling band H, Figs. 1, 1$^a$, and 6, which conveys the said matter to a distant part of the building, as shown in Fig. 1$^a$, there to be treated in what may be termed the "finishing-screen" J, as hereinafter described.

The particles of the refuse which have not fallen through the meshes of the screen G are discharged through the outlet end, and, falling down, are met by a strong blast of air from the fan D′, which separates the lighter from the heavier particles, driving the former up through the duct K into the drying-oven M and allowing the heavier particles to fall through the blast of air into the chute L, which delivers them to an elevator N. It may be that some of the heavier particles by reason of their formation will be carried past the entrance to the chute L and to a slight extent up the duct K, but not all the way to the oven M. It is to catch such particles as these that we provide the opening $k$, which forms the inlet to the chamber $k'$, entrance to which for periodical cleaning may be had through a suitable door. As an example of the utility of this provision may be cited the effect on such a particle of the refuse as a cabbage-leaf. If the said leaf when falling receives the blast, as it were, broadside on, then, by reason of its comparatively large surface, it will be carried up the duct K past the opening $k$; but, by reason of its weight or by a change in its movement and consequent removal of its large surface from the influence of the blast, the said blast will not carry it to the oven. It will therefore fall onto the lower side of the chute and will slide down until it reaches the opening $k$, through which it will fall into the chamber $k'$, to be subsequently disposed of by burning or otherwise, as may be found most convenient.

K′ is a door, by the removal of which access may be had to the interior of the duct K for cleaning or other purposes.

The elevator N, into which are conducted by the chute L the heavier particles falling from the outlet of the screen G, conveys the said heavier particles up to the screen O, Figs. 5, 6, 10, and 11, which is hereinafter termed the "separating-screen." This screen may be of cylindrical or polygonal section, and, like all the other screens, may be provided internally with a helix or screw creeper or conveyer for moving the matter introduced from the inlet to the outlet end, and the said screen is composed of wire netting or cloth of varying dimension of mesh, that at the inlet end being preferably of two-inch mesh while that at the outlet end is preferably of three-inch mesh, one half of its length being advantageously of the former and the other half of the latter size, though the change of mesh may be gradual, if desired. This screen O, as shown clearly in Figs. 10 and 11, is situated above the upper end of two inclined chutes P, while the outlet end of the said screen discharges the refuse which has not passed through the wire-work wall of the screen onto a third chute P′ practically similar to those marked P.

To the lower ends of the chutes P are connected by plates $P^2$ or their equivalent other chutes $P^3$ in such manner that gaps $P^4$ are left between the adjacent ends of the chutes P and $P^3$, and in like manner to the lower end of the chute P′ is connected a chute $P^5$, between which and the chute P′ a gap $P^4$ is left. The lower end of the chute $P^5$ discharges onto the adjacent chute $P^3$, and the lower end of the chutes $P^3$ discharge the matter which gravitates down them onto the revolving table Q, Figs. 1, 5, 10, and 11. The construction of this revolving table will be best understood by reference to Fig. 12, wherein part of it is represented in plans taken at different levels, and to Fig. 13, which is an elevation representing on a larger scale the means for driving and supporting the said table. In these figures Q is the table-top, which is in the form of a ring, and may be made up of a number of suitably-shaped iron plates riveted or otherwise conveniently connected together. Q′ are standards beneath the table Q, and upon which are mounted rollers $Q^2$ $Q^3$, which are preferably surrounded by india-rubber rings or tyers $q$. The rollers $Q^2$ support the table against vertical displacement and the rollers $Q^3$ secure it against horizontal displacement by bearing against the two vertical sides of the toothed rack $q'$, which is rigidly secured to the under side of the table in any suitable manner. $Q^4$ is a shaft supported in bearings $Q^5$, carried by brackets $Q^6$, and upon which shaft is keyed or otherwise secured a pinion $Q^7$, which gears with the circular rack $q'$, to which it transmits the motion imparted to the shaft $Q^4$. The brackets $Q^6$ are secured to one of the standards Q′′ by bolts and nuts $q^2$ or otherwise, as may be found most convenient. From this description it will readily be understood that when rotary motion is imparted to the shaft $Q^4$ the table is caused to move round horizontally at a comparatively slow speed.

In place of the table Q, as described, a band or table traveling in a straight line could be employed. The table Q is, however, preferred.

R, Fig. 1, is a "devil" or shredding-machine, which may be of any ordinary construction, and which is preferably situated near the drum A, as it is the large pieces of paper, rag, and such like material picked out by hand from the drum A that the said devil is chiefly intended to operate upon.

R′ is a powerful fan, which is so applied to the devil that its blast will force the torn-up particles of paper, rag, &c., leaving the devil along the duct $R^2$ into the before-mentioned oven M. This oven is preferably constructed in the manner shown in Fig. 7, in end elevation, and Figs. 8 and 9, respectively, in longitudinal and transverse vertical sections, though any other suitable form of oven may be employed in its stead.

Figure 9:
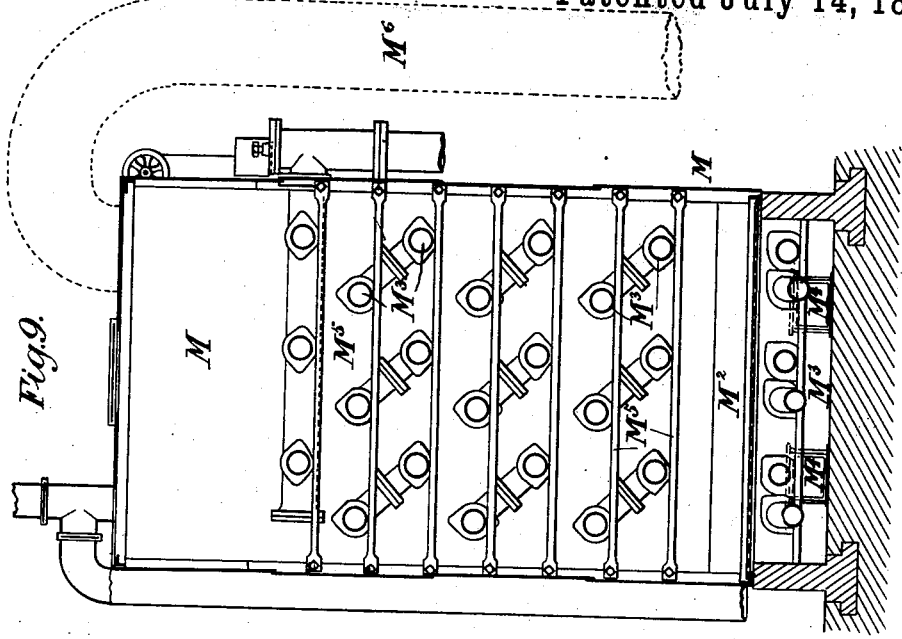
Figure 8:
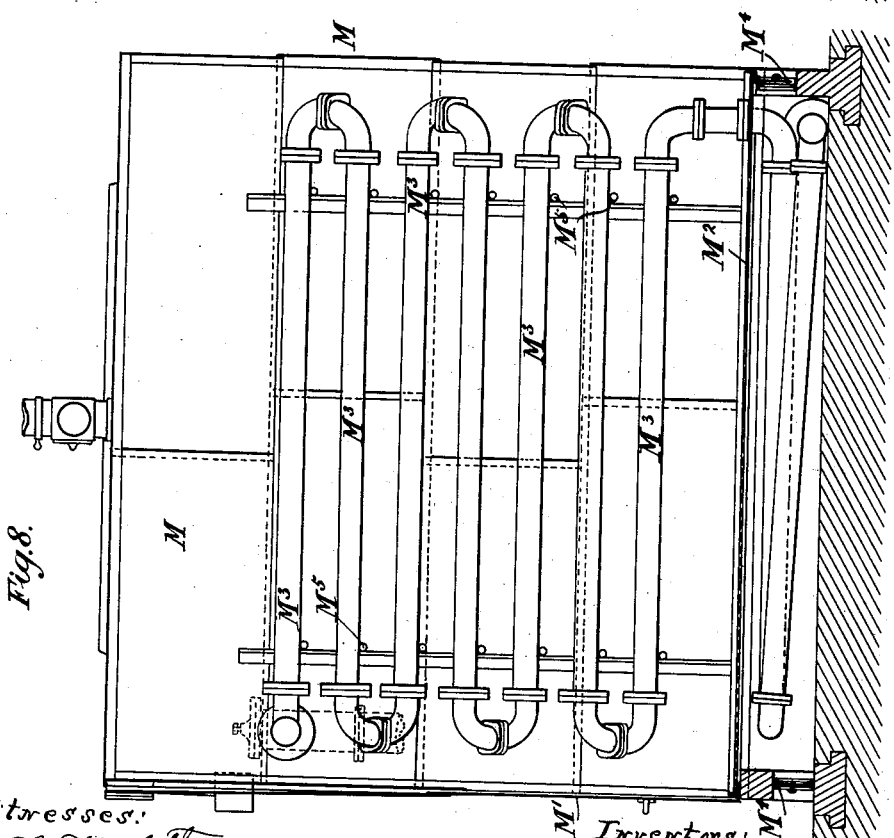

In Figs. 7, 8, and 9, M is the oven-casing, which is provided with a conveniently-counterbalanced door M′, so that ready access to the interior may be had for removing the contents. $M^2$ is a perforated plate, and $M^3$ a coil of pipes, part of which is above and part below the plate $M^2$, and through which the waste steam from the engine S, Fig. 1ª, is passed. $M^4$ are doors or dampers for cleaning out from below the perforated plate $M^2$, or relieving the pressure in the oven caused by the two blasts delivered into it by the ducts $R^2$ and K. $M^5$ are bearers for supporting the pipes or coils of pipes $M^3$. If desired, the dust which is raised in the oven M may be drawn or forced into an outlet-pipe, such as is represented in dotted lines and marked $M^6$ in Fig. 9, and wherein it may be deposited by means of a water-spray or steam-jet, the resulting mud being burned or otherwise conveniently disposed of.

The before-mentioned finishing-screen J, being of no special construction and practically similar to the screen G, is not shown in detail in the accompanying drawings, but its position relatively to that on the other machinery is clearly indicated in Fig. 1ª and its position relatively to the washing-elevator T, which treats the matter discharged through the outlet end of J, is clearly shown in Figs. 1ª and 14. Of this screen, however, it may be explained that the mesh is preferably about half an inch and that it is provided with an internal screw-conveyer for moving the matter introduced gradually from the inlet to the outlet end, where it is discharged onto a chute J′, Fig. 14, down which it falls into the elevator T. This elevator is shown in vertical section in Fig. 14, wherein T represents the buckets or elevator proper, which buckets are carried on, preferably, two endless parallel chains $t$, (only one of which is shown in Fig. 14,) and the bottoms of which buckets are perforated or formed of wire-cloth or the equivalent thereof. T′ $T^2$ $T^3$ $T^4$ are wheels or rollers, around or over which the chains $t$ pass, so as to move the buckets T in the desired directions. Of these rollers that marked T' is the driving-roller and that marked T² is for tipping the buckets so as to discharge their contents onto a chute U, this roller T² being provided with rods t', adapted to support the lower ends of the buckets T in the manner shown in Fig. 14. T⁵ is a trough, at the opposite ends of which the rollers T³ T⁴ are situated, so that the buckets and their contents may be moved through the water contained in the trough. T⁶ is a vertical casing, preferably connected at its lower end to the trough T⁵, and up through which the bucket T are drawn when passing from the roller or wheel T⁴ to the tipping-roller T², and down through which a constant and heavy fall of water is maintained from the inlet t² into the trough T⁵, the overflow pipe t³ of which carries off the superfluous water to a suitable outlet. Thus it will be seen that whatever impurities—dust and the like—may be present among the matter discharged from the outlet end of the screen J will be removed by the thorough washing process to which the said matter is subjected while in the buckets T, it being observed that by the bottoms of the buckets being perforated the water entering through the inlet t² is able to scour every particle of the matter subjected to its influence.

Although in Fig. 14 there is represented the preferred manner of constructing the washing-elevator, yet there are various modifications that could be made in the construction which would still embody the same principle.

U' is a chute, preferably of sheet-iron, onto which the chute U delivers the matter cast onto it by the buckets T. The chute U', which is most clearly shown in section in Fig. 15, is formed with an opening U², and under the chute at this part are provided one or more (in the case shown in the drawings two) short adjustable chutes u, which are provided for the purpose of forming one or more gaps U³ in the main chute for "trapping" certain of the particles which gravitate down the said chute, the main portion of which particles, according to their nature, will, however, leap across the gaps U³ and be discharged from the extreme lower end of the chute U'.

The before-mentioned boilers E (shown only in Fig. 1ª) and the arrangements for firing them may be of ordinary construction, a forced draft, as before explained, being applied to the furnaces, so as to fit them to the burning of small and inferior kinds of fuel, such as are recovered from the refuse treated according to this invention. The boiler F, however, besides being adapted to be heated by this class of fuel is also fitted with furnaces specially constructed with the object of burning up the garbage and other such matter as may be separated from the refuse and cannot be applied to any other useful purpose, and the said boiler may be heated by a mixture of the said garbage and the before-described small fuel. In Fig. 16 this boiler and setting are shown one half in side elevation and the other in longitudinal vertical section.

Figs. 17 and 18 are sectional views of the special damper arrangement of the furnaces of the boiler F, by which the consumption of the smoke is effected, as hereinafter explained.

The boiler F, as represented in the drawings, is of the Cornish type, though it will be obvious from the subsequent explanation that boilers having more than one flue-tube may be as readily employed in its place.

As shown in Fig. 16, the furnace is not located in the boiler-tube F', as is usual, but is arranged exteriorly—that is to say, the heat is applied to the outer shell of the boiler, the tube F' being used merely as a flue. There is a furnace F² at one end and another furnace F¹² at the other end of the boiler, these being separated by the bridge F³. These furnaces are of similar construction, but to each is applied a distinctive reference letter to facilitate the explanation of the working thereof. F⁴ are chambers which extend beyond the ends of the boiler and form, practically, extensions of the tube F'. Both of these chambers, and the parts directly connected therewith, being of like construction, the following description of one of them will be sufficient to enable the working thereof to be clearly understood. The chamber F⁴ at its lower part is formed with an opening F⁵, communicating directly with the front of the furnace, and at its upper part with an opening F⁶, communicating directly with flues F⁷, and through them with the uptake F⁸, as shown clearly in Fig. 1ª. F⁹ is a damper or valve, which is movable within the chamber F⁴ and may be lowered so as to close the opening F⁵, as shown in Fig. 16, and thus cut off the communication between, say, the furnace F³ and the boiler-tube F', which at the end thus adjusted is thrown into communication with the uptake; or the said damper or valve may be raised so as to close the opening F⁶, and thus, as shown in Fig. 17, break the communication at this end between the tube F' and uptake, and establish one directly between the furnace F² and the tube F'. Now the damper or valve F⁹ at one end is connected to the corresponding damper or valve at the other end by a chain or the like, conveniently fastened thereto by the slings F¹⁰, the arrangement being such that when one damper closes the one opening F⁵ and uncovers the opening F⁶ at one end of the boiler the other damper closes the opening F⁶ and uncovers the opening F⁵ at the opposite end of the boiler, and vice versa. C is the pipe for introducing the forced draft into the furnace, which it does through the nozzles C', fitted into the firebridge F³.

The furnaces F² and F¹² are alternately charged with fuel, and the following is the manner in which is effected the consumption of the smoke, which could not be allowed to escape into the atmosphere in an unconsumed condition, being of a very noxious character, consequent on the nature of the garbage, &c., from which it was evolved. Supposing that it was the furnace $F^{12}$ that was last charged with fuel (garbage) and that it is now burning brightly—that is to say, in a glowing condition—and that it is desired to supply the furnace $F^2$ with garbage fuel, the dampers are operated so that the opening $F^5$ of the furnace to be "stoked" is closed and the corresponding opening of the other furnace—in this example $F^{12}$—is opened. The garbage is then charged into the furnace $F^2$ and the door closed. Those of the dense and noxious fumes now driven off from this new charge which are not consumed in the furnace $F^2$ will pass over the bridge $F^3$ and over the glowing fire $F^{12}$, where they will be wholly consumed, the resulting gases passing through the opening $F^5$ of the "unstoked" end into the boiler-tube $F'$, from the opposite end of which they escape through the opening $F^6$ of the stoked end to the flues $F^7$ and uptake $F^8$, substantially as indicated by the arrows in Fig. 16. In the reverse manner, when it is desired to charge the furnace $F^{12}$ with garbage, the dampers $F^9$ are so adjusted that the course of the products of combustion under and through the boiler will be reversed, the fumes from the furnace $F^{12}$ passing in one direction beneath the boiler and over the furnace $F^2$, and in the opposite direction through the boiler-tube $F'$ to the uptake $F^8$.

Suitable doors $f$ are provided for enabling the flues to be cleaned. Before being allowed finally to escape into the atmosphere the products of combustion of all the boilers E E and F may be passed through washing-scrubbers similar to those employed in gas-works, so that all the carbonaceous matter will be deposited and only a colorless and innocuous vapor allowed to escape into the atmosphere.

In Fig. 1, V represents a furnace wherein old metal fragments, especially tin, in the form of boxes, canisters, cooking utensils, and other such articles may be treated for recovering the solder therefrom, this furnace being any convenient construction suited to the purpose. W, Fig. 1, is a furnace or chamber into which are thrown articles such as mattresses, there to be baked for disinfecting purposes, or carbonized, as may be found most desirable. X, Fig. 1, is an ordinary mortar-mill.

Generally the manner of treating the refuse by the before-described series of apparatus is as follows: The refuse is tipped out of the vehicle by which it is conveyed to the works preferably directly into the rotating reception-drum, and though load after load may be thus tipped in at suitably-adjudged intervals of time it will be most convenient for the purposes of this specification to trace out the course pursued by one such quantity, it being explained that all the refuse treated will be divided and subdivided and otherwise operated upon in a practically similar manner. By the revolving drum A the largest particles of the refuse will be separated from the smaller, and will move toward the back end of the drum, where they will be picked out by hand, the slow rate of speed permitting of this being done and at the same time allowing them to be disposed of according to their nature, the paper, rags, and such like material being fed into the devil or shredding-machine R, to be therein torn or shredded and subsequently blown to the oven M by the fan $R'$ and through the duct $R^2$, the tins, pans, and such like to be conveyed, if so desired, to the furnace V for the recovery of the solder and tin therefrom, the mattresses and other such articles to be conveyed to the furnace W for disinfecting or carbonization, the pieces of crockery and like material to be conveyed to the mortar-mill X, wherein they may be ground, and, if desired, mixed with lime for making mortar, and in fact dealt with in the manner which may be found most profitable. The refuse falling through the circular wall of the drum A reaches the elevator B, by which it is introduced into the revolving screen G. The smaller particles of the refuse here fall through the meshes of the screen and are conducted by the lower part of the casing of such screen onto the traveling band H, which conveys it to the finishing-screen J. It may here be mentioned that the material which the band H conveys to the screen J is found to consist chiefly of small pieces of coal, cinders, and ashes, and by the screen J the dust and smaller particles of these are separated from the larger. The said smaller particles fall through the meshes of the screen onto a suitable chute, which may discharge them into a suitable receptacle, which in the case of river-side or canal-side premises might conveniently be a barge, by which, when a sufficient quantity has accumulated, the said matter would be conveyed to brick-makers, to whom it is readily salable for brick-making purposes. The larger particles delivered through the outlet end of the screen J fall into the washing-elevator T, wherein they are thoroughly scoured, as has been hereinbefore described, and from which they are discharged onto the gravitation-chute $U'$. Having arrived here, where the matter treated is generally found to consist principally of small pieces of coal, coke, and cinders, it is desirable to remove any vegetable matter—such as potato-peeling— which has accompanied this fuel up to this stage. It is for this purpose that the chute $U'$ is provided, for while passing down this the vegetable matter, by reason of its sticky nature will cling to the chute $U'$ itself and slide slowly down until it reaches the gaps $U^3$, through one or other of which it will fall and may be received in a suitable receptacle for subsequent disposal, as may be desired, whereas the coal, coke, and such like material, being of a free nature, in passing down the chute $U'$ will gain an impetus which will carry it across the gaps $U^3$ and it will be discharged into a convenient receptacle, from which it may be taken as required for firing the boilers E E and F, the fuel so recovered being generally sufficient to keep the boilers working, it being here explained that beside the garbage consumed in the furnaces of the boiler F, a small quantity of this small coal and coke fuel may be used. Should more of this fuel be recovered than is wanted for the boilers it can be sold, or, if desired, it may all be sold and other fuel used for the boilers, though generally this fuel would be the cheapest to use.

To return now to the main course of the operations of which the last constitutes but one of the branches, the material which was not small enough to pass through the wirework wall of the screen G is delivered through the outlet end, and in falling therefrom is met by the blast from the fan D', which separates from the heavier the lighter particles, which mainly consist of pieces of paper, rag, and perhaps some fragments of straw and such like material, and drives the said lighter particles through the duct K into the oven M, wherein they are dried and from which they are periodically taken for further separation, if necessary, and subsequent treatment in beaters, by which they are converted into paper-pulp in the ordinary well-known manner for subsequent conversion into paper. Those of the particles falling from the outlet end of the screen G which are heavy enough to cross the air-blast fall into the chute L, by which they are delivered into the elevator N, which conveys them into the separating-screen O. Here they are separated out over the large surfaces of the chutes P and P', and the vegetable or other such matter of a sticky nature will cling to the said surfaces and slide slowly down until they reach the gaps $P^4$, through which they will fall into sacks or other suitable receptacles, from which they may be collected for disposal, as may be found most convenient. The material which is not of a sticky nature, when falling down the chutes P and P', will gain impetus enough to carry it across the gaps $P^4$ onto the chutes $P^3$ and $P^5$, by the chutes $P^3$ of which the said material is deposited on the slowly-revolving table Q. At the inside or outside or at both the inside and outside of this table are stationed attendants whose duty it is to sort out the material which is slowly but continuously moved toward them. This material is here found to consist of a large variety of different species, among which may be mentioned large pieces of coal, metal, and crockery. The coal here found is conveyed to a suitable part of the building, and may be sold as fuel for domestic purposes, or burned under the boilers. The metal may be sold as scrap, and the pieces of crockery and like matter may be placed in the mill X, and there ground up, and, if necessary, mixed with lime and water to make mortar, and, in fact, all the species separated at the table Q will be treated in the manner best suited to the insuring of a profitable return upon the expenditure for cost of plant and time and labor involved in the dividing of the refuse into the respective and numerous species of which it is composed. As a result of this process, there is found but very little really useless matter to dispose of, and what there is may be reduced to the smallest possible bulk by consuming as far as may be possible in the furnaces of the boilers E and F, and even then the resulting clinker may be ground up in the mill X and subsequently utilized. It will thus be seen that from the beginning to the end of this process a complete, and, as it were, self-supporting cycle of operations is performed, for while many of the species separated out from the refuse will be most profitably disposed of for outside manufacturing and other purposes, and thus yield a satisfactory return for the expenditure of recovering such species, there will still remain fuel sufficient to generate the power for operating the apparatus used for attaining such a result.

It will readily be understood that many modifications may be made in the manner of carrying this invention into practice and in the various apparatus employed. For example, instead of revolving drums reciprocating sieves may be used, though such would be far less desirable. Instead of using air-blasts, as before described, steam or other blasts may be employed, if desired.

A certain number of boilers, one of them of particular construction, has been described as used in the carrying out of this process; but any desired number of boilers and of any suitable construction may be employed.

The paper-making plant may be upon the same premises as the other machinery and be driven from the same power, or may be entirely distinct and in another building.

We claim—

1. In an apparatus for the treatment of city refuse, the combination of a series of screens for separating the ingredients of different sizes, blowers for separating lighter from heavier materials, chutes having openings therein for separating mineral from vegetable substances, and conveyers for transporting the materials to and from said devices, substantially as described.

2. In an apparatus for the treatment of city refuse, the combination, with a series of screens of different meshes and conveyers for transporting refuse to and from the screens, of blowers at the screens, an oven, and ducts leading from the blowers to the oven, substantially as described.

3. In an apparatus for the treatment of city refuse, the screens A and G, of different meshes, the blowers, an oven, ducts leading from the screens to the oven, the finishing-screens O and J, the washing-elevator T, and the chutes U and P for separating vegetable from mineral substances, substantially as described.

4. In an apparatus for the treatment of city refuse, the combination of a sifter, a shredding-machine, a blower, an oven, and a duct leading from the shredding-machine to the oven, substantially as described.

5. In a system of treatment of city refuse, the combination, with the screens, conveyers, and blowers, of a traveling table, an oven, and a washing apparatus, each arranged to receive a portion of the refuse ingredients, substantially as described.

In testimony whereof we have hereto set our hands in the presence of the two subscribing witnesses.

JOHN CHARLES WILLIAM STANLEY.
JOSEPH RUSSELL.

Witnesses:
HARRY B. BRIDGES,
WILLIAM W. RICHARDSON.